Nov. 11, 1958     W. HONEGGER     2,860,017
PACKING FOR A PISTON LONGITUDINALLY
DISPLACEABLE IN A HOUSING
Filed July 24, 1956
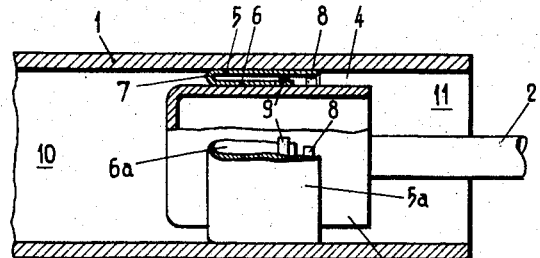
Fig. 1
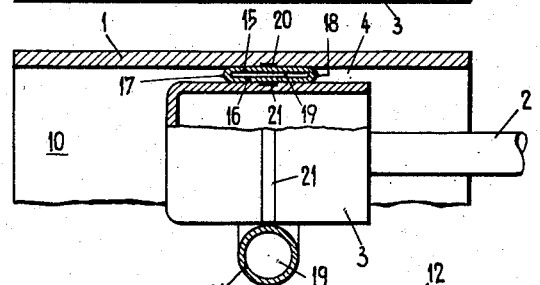
Fig. 4
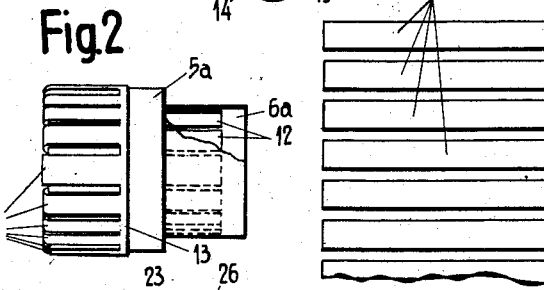
Fig. 2
Fig. 3
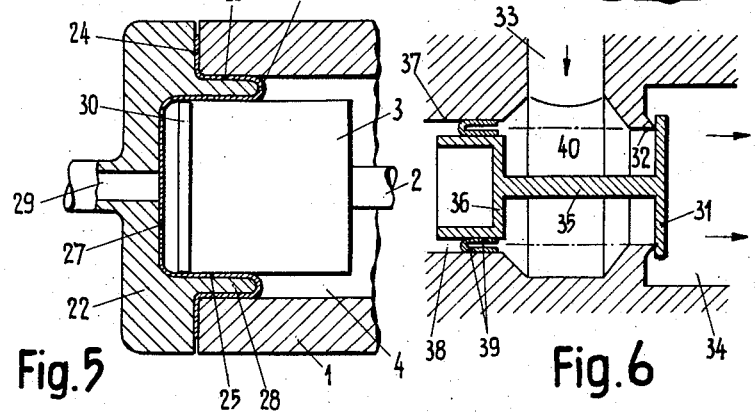
Fig. 5     Fig. 6
INVENTOR.
WILLY HONEGGER
BY United States Patent Office 2,860,017
Patented Nov. 11, 1958

2,860,017

PACKING FOR A PISTON LONGITUDINALLY DISPLACEABLE IN A HOUSING

Willy Honegger, Zurich, Switzerland, assignor of one-half to Albert Lins, Zurich, Switzerland Application July 24, 1956, Serial No. 599,729

Claims priority, application Switzerland July 26, 1955

5 Claims. (Cl. 309—23)

The present invention relates to a packing construction for use in the annular space around a piston arranged in a housing or cylinder for longitudinal displacement.

The space between the piston and the inner surface of its housing has so far been sealed by metal piston rings, by way of example in internal combustion engines, or by packing rings formed of an elastic material, such as leather, in pumps and other slow-running machines where operating temperatures are rather low. With packings of the latter type, a substantial frictional resistance is unavoidable during the piston movement, and this frictional resistance is the greater the more efficient the packing is required to be. However, there are many applications where such frictional resistance is highly undesirable either because of the rapid wear of the packing or because of heating and of power consumption, and a packing free from the said disadvantages is needed for such purposes.

The present invention relates to such a packing structure and is characterized by a packing member formed of a flexible material which is tubular in shape and has at least one end bent over and turned inwardly so that an elastic sleeve has formed which has double walled portions and has at least one front face closed by an annular bend, the said packing member being arranged in the annular space to be sealed, enclosing the piston and having one annular zone of its outer section attached to the housing wall and one annular zone of its inner section attached to the piston wall in airtight relationship so that the inside of the sleeve is displaced relative to the outside of the said sleeve when the piston performs its longitudinal travel while the front bend or bead in the annular space rolls off in the direction of movement.

A number of embodiments of the present invention are described in greater detail in conjunction with the drawing, in which:

Fig. 1 is an axial section of a cylinder with a piston shown partly in section, provided with a first embodiment of the packing according to the present invention;

Fig. 2 shows the packing member disclosed in Fig. 1 equipped with a cage formed of strips;

Fig. 3 shows a development of a cage forming strip according to Fig. 2;

Fig. 4 is a second embodiment of the packing according to the present invention;

Fig. 5 shows a third embodiment of a packing according to this invention in a cylinder shown in axial section and having one end closed, and Fig. 6 is a diagram of the packing according to the present invention applied to a pressure compensated valve.

In the embodiment shown in Fig. 1, the piston 3 which is longitudinally displaceable by means of piston rod 2 and forms an annular space with the inner wall of cylinder 1 which space is to be sealed. Sealing is effected by a packing member arranged in the annular space 4 which member forms a double walled sleeve with an outer portion or section 5 and an inner portion or section 6. The outer and inner sections 5, 6 are connected at one front end by bead 7. The sleeve shown is formed by a length of hose having the diameter of the outer section 5, of which one end is bent and turned inwardly so that the outer and inner sections 5, 6 form an annular bead together. The outer section 5 is attached in air-tight relationship along an annular zone of its circumference, by way of example closely adjacent one end, to the inner wall of cylinder 1, such attachment being effected as by the clamping ring 8. In similar manner the ring 9 attaches an annular zone of the inner section 6 of the sleeve to the piston 3 in air-tight relationship. The clamping rings 8, 9 may be replaced by some other form of air-tight connection of an annular zone of the outer and inner sections 5, 6 of the sleeve with the cylinder 1 and the piston 3 respectively, such as by cementing.

The packing sleeve assembly 5, 6, 7 which is partly double walled forms a tight seal in the annular space 4 between piston 3 and the wall of cylinder 1 but enables the piston 3 to be axially displaced in cylinder 1 within certain end positions of travel. During such displacement, the outer and inner sections 5, 6 of the sleeve roll relative to one another and the front bead 7 moves relative to the cylinder 1 and the piston 3. If the material forming the sleeve is suitable, the power requirement for this rolling-off movement is very small and any friction between piston 3 and cylinder 1 is avoided while the annular space 4 is completely sealed. Naturally the packing sleeve assembly or member 5, 6, 7 cannot at the same time provide the bearing and guide for piston 3 in cylinder 1 so that the piston rod 2 is required to guide piston 3 coaxially with cylinder 1 (not shown) in the present embodiment.

The sleeve assembly 5, 6, 7 is advantageously arranged so that the front bead 7 always faces the cylinder space 10 having a negative pressure relative to cylinder space 11. Fig. 1 accordingly shows an arrangement for an air pump in which the space 10 communicates with the container to be evacuated. For compressor-type applications in which space 10 is under higher pressure than space 11, the packing sleeve 5, 6, 7 would be reversed so that the front bead 7 faces space 11.

The material of packing sleeve 5, 6, 7 is such as to endure, in continuous operation, the rolling-off movement along the annular space 4 produced by the displacement of piston 3 without wear and to offer a maximum resistance to an elongation parallel with the sleeve axis. Flexibility of the sleeve material at operating temperatures must of course be ensured. By way of example, a rubber hose or a suitable flexible synthetic material, such as Teflon or nylon, may be employed. A suitable liner may be provided to offer reinforcement, such as ribbons, threads or wires arranged within the material parallel with the sleeve axis, which substantially eliminates the elongation of the sleeve material in the axial direction while hardly affecting flexibility in the direction transverse thereto. A sleeve material reinforced in this manner enables the packing assembly according to this embodiment to be employed where large pressure differentials obtain between the cylinder spaces 10, 11.

The reinforcement of sleeve assembly 5, 6, 7 according to Fig. 1 may also be effected by means of a cage according to Figs. 2 and 3, which encloses the outer surface 5a of the outer section 5 of the sleeve, and the inner face 6a of the inner section 6 of the sleeve thereby enclosing the annular bead 7. The arrangement is such that the said cage at all times faces the negative pressure space, i. e. space 10 in Fig. 1. According to Fig. 2 and the development shown in Fig. 3, the cage is composed of a plurality of flat strips 12 formed of a thin material, such as sheet steel, having a thickness of less than 0.2 mm., which are held together by a transverse web 13. The width of the strips and their relative distance are so dimensioned that the web 13 can, by way of example, engage the outer face 5a, while the sections of the strips 12 engaging the inner face 6a after being bent over are longitudinally movable relative to one another despite the smaller inner diameter of the sleeve. For this purpose, the sum of the width of all strips must be smaller than the circumference of the inner face 6a of the sleeve. Conversely, the web 13 may be arranged on the inner face 6a of the sleeve, the distance between two adjacent strips on the outer face 5a of the sleeve being correspondingly larger.

If desired, particularly where the pressure differential between spaces 10 and 11 is large, two or more cages according to Fig. 2 may be provided and slipped over one another, the strips of the one cage being used to cover the spaces between the strips of the adjacent cages. This enables a highly flexible and even elastic sleeve material to be used where the pressure differential between the cylinder spaces 10 and 11 is large, since the said material overlies a strip of the cages throughout.

If desired, such cages formed of metal or plastic bands or strips of mesh-type material may also be embedded in the sleeve material.

In the embodiment according to Fig. 1, the packing member is designed as a sleeve having the side walls 5 and 6 forming a front bead 7 together. If desired, the opposite sleeve end may be turned over so that a bead is arranged at both ends of the sleeve in the annular space 4. Such a double sleeve may be formed in the manner illustrated in Fig. 4 by placing a hose 14, which is deformable in the radial direction, around piston 3 and flattening it so that it fills annular space 4 and forms a double walled sleeve comprising the outer and inner walls 15, 16, and the two beads 17 and 18. The inside 19 of hose 14 may be filled with pressurized gas or with liquid. The outer face of the outer wall 15 is cemented to cylinder 1 along annular zone 20 and the cylinder is provided with a shallow groove for this purpose. A corresponding air-tight connection is effected between the inner face of inner wall 16 and the piston 3 by means of cementing along annular zone 21.

The design of the present packing shown in Fig. 4 possesses the advantage that the piston is supported in the cylinder 1 by the two front beads 17, 18 of the sleeve which roll off when the said piston moves along the annular space 4 so that the piston is guided along the cylinder. If desired, the inner space 19 may communicate with the overpressure chamber 11, by way of example via bores along the annular zone 21 through the piston wall. Furthermore the interior 19 of the hose 14 may be filled with a sufficiently resilient material, such as foam rubber, or a homogeneous round section may be used. If desired, two or more such packing members may be arranged in line in space 4.

As shown in Fig. 5, the packing of the design here illustrated enables the clearance volume between the piston 3 and the closure 22 of the cylinder 1 to be reduced, which is most important in the operation of cylinders having a short stroke. The outer wall 23 of the sleeve is clamped between the cylinder and its closing cap 22 along the edge 24, and its opposite end forms a front bead 26 with the inner wall 25 of the sleeve. The inner wall 25 here continues along the front side of the piston 3 forming a transverse wall 27 so that the two cylinder spaces are completely separated by the sleeve according to this embodiment. In the end position of piston 3 shown in Fig. 5, the transverse wall 27 of the sleeve rests on the front side of piston 3 and on the closing cap 22. A marginal bead 28 provided on the closing cap 22 projects into the space between the outer and inner walls 23, 25 of the sleeve, filling it out up to the annular bead 26. In this end position of the piston 3, the cylinder volume between the closure 22 and the transverse wall 27 of the sleeve is practically zero, apart from the intake 29 and a valve arranged therein respectively. If desired, the inner wall of sleeve 25 may be cemented into the shallow groove 30 of piston 3 along an annular zone so as to ensure that the transverse wall 27 remains in position on the front end of the piston when the latter is withdrawn.

Apart from the operating piston of the design illustrated in Figs. 1, 4 and 5, the packing according to the present design, thanks to the practically frictionless rolling-off movement of the packing member, enables the provision of pressure compensated valves according to the principle shown in Fig. 6. The valve comprises a valve disc 31 and a valve seat 32 and is designed to close the supply line 33 against the outlet line 34. Rigidly connected with the valve disc 31 by means of pin 35 in an opposed piston 36 which is longitudinally displaceable in a cylinder with which it forms an annular space 38. Relative to cylinder 37 the piston 36 is sealed by means of the sleeve 39 arranged in the said space 38, the sleeve being designed as illustrated in the embodiments shown in Figs. 1–5. If the mean diameter of the said annular space 38 and of the packing sleeve 39 is dimensioned equal to the effective diameter of the valve disc 31 as indicated by broken lines in Fig. 6, the pressure in space 40 is accurately compensated by an equal oppositely directed force exerted on the opposed piston 36 and the half sleeve 39. The precondition is that the pressure in cylinder 37 is the same as in line 34, which may easily be ensured by a pressure compensating line.

Owing to the compensation of the pressure effective on the valve disc 31, the latter may be held in the closed position indicated by a small force irrespective of the pressure differential between space 40 and line 34. For axial displacement, i. e. opening the valve disc 31 together with pin 35 and opposed piston 36, only a relatively small force is required since the friction of the packing sleeve 39 is very small and its effective mean diameter is practically constant even when the opposed piston 39 is displaced.

Filling a closed sleeve with a liquid, such as shown in Fig. 4, or reinforcing the sleeve with overlapping strips, Fig. 3, provides increased safety against the diffusion of gases.

In the embodiments shown, both the piston and the cylinder or housing are cylindrical. Naturally conical designs are possible in conjunction with short piston travels.

Having now particularly described and ascertained the nature of my said invention and in what manner the same is to be performed, I declare that what I claim is:

1. In a packing assembly for the annular space between a longitudinally displaceable piston and the inner wall of a substantially cylindrical housing enclosing the said piston; comprising a sleeve-shaped packing member of flexible material which forms an outer wall section, an inner wall section, and at least one end bent over forming a bead interconnecting said outer wall section with said inner wall section, said packing member being arranged within the annular space between said piston and said housing, said outer wall section being attached in air-tight relationship to the wall of said housing, and the inner wall section being attached to the adjacent piston wall so that, if the piston performs a longitudinal movement relative to the housing, the inner wall section of the packing member is displaced relative to the outer wall section of the packing member, so that said bead rolls off in the direction of the piston movement within the annular space, and at least one cage-shaped covering resting on the outer and inner faces of said packing member, said cage being formed of a flexible but non-elastic material.

2. In a packing assembly according to claim 1, said cage being formed of flat, spaced strips overlying said packing member when in operative position, said strips following the rolling off movement of said bead within said annular space.

3. In a packing assembly according to claim 1, including at least more than one cage arranged to each other, so that the strips of one cage overlie the spaces between the strips of another cage on said packing member.

4. In a packing assembly according to claim 1, said strips of said one cage being formed of sheet metal of a thickness of less than about 0.2 mm.

5. In a packing assembly according to claim 1, said one cage on said packing member being formed of rubber strips cured on to one face of the said packing member.

References Cited in the file of this patent

UNITED STATES PATENTS

| | | |
|---|---|---|
| 1,964,745 | Sauzedde | July 3, 1934 |
| 2,034,538 | Schnell | Mar. 17, 1936 |
| 2,313,486 | Gratzmuller | Mar. 9, 1943 |
| 2,612,419 | Reynolds | Sept. 30, 1952 |